（12）United States Patent
Bäurle et al.

(10) Patent No.: US 8,148,968 B2
(45) Date of Patent: *Apr. 3, 2012

(54) METHOD AND APPARATUS FOR A POWER SUPPLY CONTROLLER RESPONSIVE TO A FEEDFORWARD SIGNAL

(75) Inventors: Stefan Bäurle, San Jose, CA (US); Zhao-Jun Wang, San Jose, CA (US)

(73) Assignee: Power Integrations, Inc., San Jose, CA (US)

( * ) Notice: Subject to any disclaimer, the term of this patent is extended or adjusted under 35 U.S.C. 154(b) by 126 days.

This patent is subject to a terminal disclaimer.

(21) Appl. No.: 12/369,590

(22) Filed: Feb. 11, 2009

(65) Prior Publication Data

US 2009/0175058 A1    Jul. 9, 2009

Related U.S. Application Data

(63) Continuation of application No. 11/543,527, filed on Oct. 4, 2006, now Pat. No. 7,502,236.

(51) Int. Cl.
*G05F 5/00* (2006.01)
*G05F 5/08* (2006.01)
*H02M 3/335* (2006.01)
*H02M 3/338* (2006.01)

(52) U.S. Cl. .................................. 323/299; 363/21.12

(58) Field of Classification Search .... 363/21.01–21.18, 363/97; 323/299, 303
See application file for complete search history.

(56) References Cited

U.S. PATENT DOCUMENTS

| | | |
|---|---|---|
| 5,008,794 A | 4/1991 | Leman |
| 5,014,178 A | 5/1991 | Balakrishnan |
| 5,038,053 A | 8/1991 | Djenguerian et al. |
| 5,045,800 A | 9/1991 | Kung |
| 5,274,274 A | 12/1993 | Leman et al. |

(Continued)

FOREIGN PATENT DOCUMENTS

DE   10 2007 016 630 A1   10/2008

(Continued)

OTHER PUBLICATIONS

Balakrishnan, U.S. Appl. No. 60/275,962, filed Mar. 14, 2001.

(Continued)

*Primary Examiner* — Jeffrey Sterrett
*Assistant Examiner* — Nusrat Quddus
(74) *Attorney, Agent, or Firm* — Blakely Sokoloff Taylor & Zafman LLP

(57) ABSTRACT

An apparatus and method of switching a switch of a power supply in response to an input voltage signal are disclosed. According to aspects of the present invention, a power supply controller includes a switch duty cycle controller coupled to receive a feedback signal and a duty cycle adjust signal. The switch duty cycle controller is coupled to generate a drive signal coupled to control switching of a switch, which is coupled to an energy transfer element, to regulate energy delivered from an input of a power supply to an output of the power supply. The power supply controller also includes a gain selector circuit coupled to receive an input voltage signal, which is representative of an input voltage to the power supply, to generate the duty cycle adjust signal received by the switch duty cycle controller. The maximum duty cycle of the drive signal to be varied in response to a plurality of linear functions over a range of values of the input voltage signal.

18 Claims, 10 Drawing Sheets

U.S. PATENT DOCUMENTS

| | | | |
|---|---|---|---|
| 5,282,107 A | 1/1994 | Balakrishnan | |
| 5,285,369 A | 2/1994 | Balakrishnan | |
| 5,313,381 A | 5/1994 | Balakrishnan | |
| 5,513,088 A * | 4/1996 | Williamson | 363/21.18 |
| 5,959,851 A | 9/1999 | Shutts | |
| 6,107,851 A | 8/2000 | Balakrishnan et al. | |
| 6,147,883 A | 11/2000 | Balakrishnan et al. | |
| 6,154,377 A | 11/2000 | Balakrishnan et al. | |
| 6,212,079 B1 | 4/2001 | Balakrishnan et al. | |
| 6,226,190 B1 | 5/2001 | Balakrishnan et al. | |
| 6,229,366 B1 | 5/2001 | Balakrishnan et al. | |
| 6,249,876 B1 | 6/2001 | Balakrishnan et al. | |
| 6,297,623 B1 | 10/2001 | Balakrishnan et al. | |
| 6,304,462 B1 | 10/2001 | Balakrishnan et al. | |
| 6,313,976 B1 | 11/2001 | Balakrishnan et al. | |
| 6,337,788 B1 | 1/2002 | Balakrishnan et al. | |
| 6,351,398 B1 | 2/2002 | Balakrishnan et al. | |
| 6,356,464 B1 | 3/2002 | Balakrishnan et al. | |
| 6,362,981 B1 | 3/2002 | Balakrishnan et al. | |
| 6,366,481 B1 | 4/2002 | Balakrishnan et al. | |
| 6,388,853 B1 | 5/2002 | Balakrishnan et al. | |
| 6,400,584 B1 | 6/2002 | Sabate et al. | |
| 6,414,471 B1 | 7/2002 | Balakrishnan et al. | |
| 6,438,003 B1 | 8/2002 | Balakrishnan et al. | |
| 6,456,475 B1 | 9/2002 | Balakrishnan et al. | |
| 6,462,971 B1 | 10/2002 | Balakrishnan et al. | |
| 6,525,514 B1 | 2/2003 | Balakrishnan et al. | |
| 6,538,908 B2 | 3/2003 | Balakrishnan et al. | |
| 6,580,593 B2 | 6/2003 | Balakrishnan | |
| 6,580,622 B2 | 6/2003 | Balakrishnan et al. | |
| 6,608,471 B2 | 8/2003 | Balakrishnan et al. | |
| 6,643,153 B2 | 11/2003 | Balakrishnan et al. | |
| 6,667,605 B2 | 12/2003 | Balakrishnan et al. | |
| 6,687,101 B2 | 2/2004 | Balakrishnan et al. | |
| 6,744,645 B2 | 6/2004 | Balakrishnan et al. | |
| 6,747,443 B2 | 6/2004 | Balakrishnan et al. | |
| 6,747,444 B2 | 6/2004 | Balakrishnan et al. | |
| 6,750,640 B2 | 6/2004 | Balakrishnan et al. | |
| 6,781,357 B2 | 8/2004 | Balakrishnan et al. | |
| 6,784,646 B2 | 8/2004 | Balakrishnan et al. | |
| 6,788,514 B2 | 9/2004 | Balakrishnan | |
| 6,833,692 B2 | 12/2004 | Balakrishnan et al. | |
| 6,876,181 B1 | 4/2005 | Balakrishnan et al. | |
| 6,882,134 B2 | 4/2005 | Balakrishnan et al. | |
| 6,900,622 B2 | 5/2005 | Balakrishnan et al. | |
| 6,914,793 B2 | 7/2005 | Balakrishnan et al. | |
| 6,924,634 B2 | 8/2005 | Jianping et al. | |
| 6,944,034 B1 * | 9/2005 | Shteynberg et al. | 363/21.13 |
| 6,954,057 B2 | 10/2005 | Balakrishnan et al. | |
| 6,967,472 B2 | 11/2005 | Balakrishnan et al. | |
| 6,992,471 B2 | 1/2006 | Balakrishnan et al. | |
| 7,034,625 B2 | 4/2006 | Pham | |
| 7,038,439 B2 | 5/2006 | Balakrishnan et al. | |
| 7,045,994 B2 | 5/2006 | Balakrishnan et al. | |
| 7,061,301 B2 | 6/2006 | Pham | |
| 7,068,022 B2 | 6/2006 | Balakrishnan | |
| 7,091,752 B2 | 8/2006 | Balakrishnan | |
| 7,099,128 B2 | 8/2006 | Balakrishnan et al. | |
| 7,109,696 B2 | 9/2006 | Balakrishnan et al. | |
| 7,110,270 B2 | 9/2006 | Balakrishnan et al. | |
| 7,502,236 B2 * | 3/2009 | Baurle et al. | 363/21.16 |
| 2004/0195976 A1 | 10/2004 | Balakrishnan et al. | |
| 2004/0212942 A1 | 10/2004 | Balakrishnan | |
| 2004/0227549 A1 | 11/2004 | Solie | |
| 2005/0073785 A1 | 4/2005 | Djenguerian | |
| 2005/0152164 A1 | 7/2005 | Balakrishnan et al. | |
| 2005/0200395 A1 | 9/2005 | Pham | |
| 2006/0028190 A1 | 2/2006 | Balakrishnan et al. | |
| 2006/0053319 A1 | 3/2006 | Balakrishnan et al. | |
| 2006/0098463 A1 | 5/2006 | Bäurle et al. | |
| 2006/0139111 A1 | 6/2006 | Pham | |
| 2006/0158909 A1 | 7/2006 | Hawley | |
| 2006/0176039 A1 | 8/2006 | Balakrishnan | |
| 2006/0176716 A1 | 8/2006 | Balakrishnan et al. | |
| 2006/0181253 A1 | 8/2006 | Balakrishnan et al. | |
| 2006/0192540 A1 | 8/2006 | Balakrishnan et al. | |
| 2006/0238224 A1 | 10/2006 | Balakrishnan | |
| 2006/0250743 A1 | 11/2006 | Balakrishnan et al. | |
| 2006/0261878 A1 | 11/2006 | Pham | |
| 2006/0273773 A1 | 12/2006 | Balakrishnan et al. | |
| 2007/0002510 A1 | 1/2007 | Bäurle et al. | |
| 2007/0007937 A1 | 1/2007 | Park et al. | |
| 2007/0007938 A1 | 1/2007 | Djenguerian et al. | |
| 2007/0008749 A1 | 1/2007 | Bäurle et al. | |
| 2007/0008753 A1 | 1/2007 | Kroes | |
| 2007/0008756 A1 | 1/2007 | Djenguerian et al. | |
| 2007/0046294 A1 | 3/2007 | Matthews et al. | |
| 2007/0047268 A1 | 3/2007 | Djenguerian | |
| 2007/0143636 A1 | 6/2007 | Bailey et al. | |
| 2008/0024105 A1 | 1/2008 | Wang | |

FOREIGN PATENT DOCUMENTS

| | | |
|---|---|---|
| WO | WO 98/11657 | 3/1998 |

OTHER PUBLICATIONS

Balakrishnan et al., U.S. Appl. No. 60/316,583, filed Aug. 31, 2001.
Balakrishnan et al., U.S. Appl. No. 60/325,642, filed Sep. 27, 2001.
Balakrishnan et al., U.S. Appl. No. 60/335,158, filed Nov. 13, 2001.
Balakrishnan et al., U.S. Appl. No. 60/350,158, filed Jan. 17, 2002.
Infineon Technologies, PWM-QR IC, TDA4605-3, "Control IC for Switched-Mode Power Supplies using MOS-Transistors," V2.0, Jul. 1, 2002 (23 pages).
CN 200710194414.2—First Office Action, issued Apr. 1, 2011, with English Translation (24 pages).
EP 07253934—European Search Report, dated Sep. 23, 2009 (6 pages).

* cited by examiner

US 8,148,968 B2

METHOD AND APPARATUS FOR A POWER SUPPLY CONTROLLER RESPONSIVE TO A FEEDFORWARD SIGNAL

REFERENCE TO RELATED APPLICATION

The present application is a continuation of U.S. patent application Ser. No. 11/543,527, filed Oct. 4, 2006, now pending, entitled "METHOD AND APPARATUS FOR A POWER SUPPLY CONTROLLER RESPONSIVE TO A FEEDFORWARD SIGNAL," hereby incorporated by reference.

BACKGROUND INFORMATION

1. Field of the Invention

The present invention relates generally to control circuits and, more specifically, the present invention relates to control circuits used in power supplies that are responsive to a feedforward signal.

2. Background

Power supply control circuits may be used for a multitude of purposes and applications. Most power converter applications have both cost and performance goals. It is therefore necessary for control circuit features to be implemented that minimize the cost of external circuitry such as the input bulk capacitor in AC/DC converter power supplies. In addition the tolerances of the control circuit are important to provide consistent performance in the power supply application as well as further reduce power converter cost by reducing the design margins that need to be applied when the power converter is developed.

Power supplies typically comprise a power supply controller circuit, a switch coupled to an energy transfer element, a source of input voltage and one or more outputs. The power supply controller typically controls a switching of the switch to regulate energy delivered from the input to the output of the power converter in response to a feedback signal generated by a feedback circuit forming part of the power converter. Power supply controller circuits operating with pulse width modulator (PWM) modes of operation regulate the duty cycle of the switch as one technique to regulate energy delivered from the input to the output of the power supply. The duty cycle of the switch is the ratio of the switch on time to an overall switching cycle period defined by the power supply controller circuit.

Power supply controllers make use of feedforward signals in common power converter topologies such as forward converters and flyback converters. A feedforward signal is a signal whose magnitude is a function of the value of the input voltage to the power converter. In general therefore a feedforward signal can be regarded an input voltage signal that is representative of an input voltage to a power supply. A feedforward signal is typically used to provide a way to adjust the switch duty cycle independent of the feedback signal or in other words for a given or fixed feedback signal. In flyback converters, the advantage of a feedforward signal can for example be to reduce the size of a bulk capacitance at the input of an AC/DC power converter in particular for power supply controllers operating in the voltage mode of control where ripple voltage across the bulk capacitor is more difficult to filter. The ability to adjust the switch duty cycle independent of the feedback signal allows fast response to ripple voltage appearing across the bulk capacitor and therefore reduces ripple voltage appearing across the output of the power converter. Without the use of feedforward techniques, the power supply controller must respond to the feedback signal that responds to ripple voltage appearing across the power converter output and the power supply controller then controls the duty cycle of the switch accordingly to reduce the power converter output ripple voltage. This introduces delays and output ripple is therefore difficult to reduce without for example increasing the size of the input bulk capacitor. In forward converters a feedforward signal is typically used by the power supply controller to control the maximum duty cycle of the switch to ensure there is sufficient time to reset the flux in the magnetic core of the energy transfer element as will be known to one skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

Figure 1:
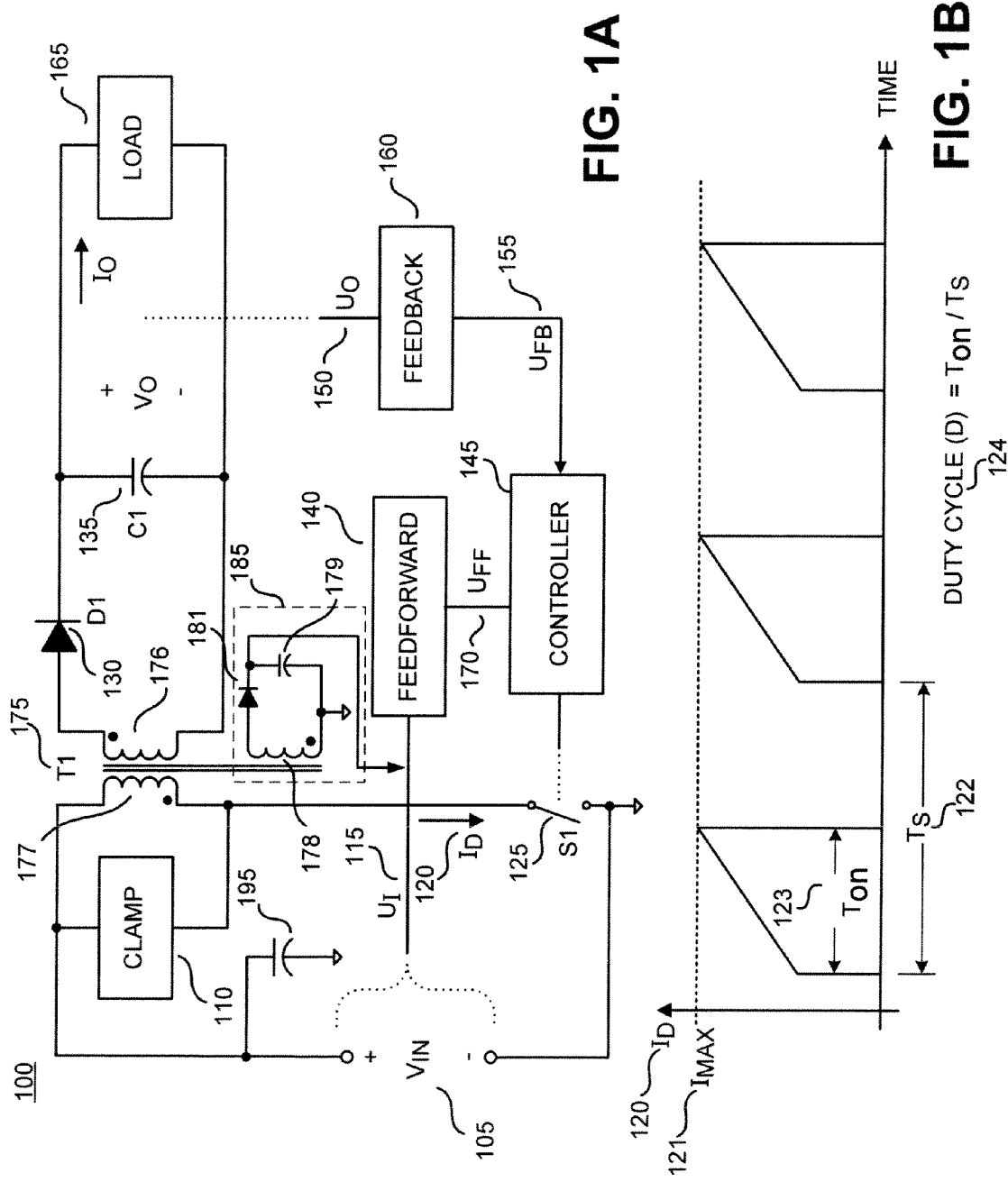
FIGS. 1A and 1B are schematics illustrating generally an example power converter employing a power supply controller circuit responsive to a feedforward signal and a feedback signal in accordance with the teachings of the present invention.

Methods and apparatuses for implementing a power supply controller circuit responsive to a feedforward signal are disclosed. In the following description numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment," "an embodiment," "one example," "an example" or the like means that a particular feature, structure or characteristic described in connection with the embodiment or example is included in at least one embodiment or example of the present invention. Thus, appearances of the phrases "in one embodiment," "in an embodiment," "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

As mentioned above, power supply controller circuits operating with PWM modes of operation regulate the duty cycle of a drive signal driving the switching of the switch as one technique to regulate energy delivered from the input to the output of the power supply, where the duty cycle of the switch is the ratio of the switch on time to an overall switching cycle period defined by the power supply controller circuit. The optimum maximum duty cycle or, duty cycle of the drive signal for a given feedback signal, is a non-linear function of the power converter input voltage. Known circuitry required to provide this non-linear function typically relies either on an external capacitor to the power supply controller, which adds cost and typically has poor tolerance or an integrated capacitor, which also has poor tolerance from unit to unit and adds silicon area therefore adding cost to the power converter design. Circuitry to apply a linear function of maximum duty cycle or, duty cycle for a given feedback signal, as a function of power converter input voltage provides optimum performance at only one input voltage level and therefore compromises the power converter design at all other values of input voltage.

A power supply controller circuit responsive to a feedforward signal in accordance with the teachings of the present invention will now be described. Examples of the present invention involve methods and apparatuses to generate a power supply controller circuit responsive to a feedforward signal. Example power supply control circuits in accordance with the teachings of the present invention provide an approximation to the ideal feedforward function of duty cycle versus power converter input voltage that retains the system level savings provided by controlling the switch duty cycle in response to a feedforward signal, while maintaining a power supply control circuit design, which is low cost and provides adequate control of unit to unit tolerance such that system level savings are retained in accordance with the teachings of the present invention.

FIG. 1A shows generally a schematic of one example of a power converter 100 employing a power supply controller responsive to a feedforward signal in accordance with the teachings of the present invention. In the example, power converter 100 is a flyback converter. It is noted that in other examples, power converter 100 could also be one of many power converter configurations such as a forward converter and could be an isolated or non-isolated converter in accordance with the teachings of the present invention.

The example power supply in FIG. 1 provides output power to a load 165 from a DC input voltage $V_{IN}$ 105. In the example, a bulk capacitor 195 is coupled across the input to the power converter 100. In applications where the input voltage 105 is generated from an AC source that is not shown, this bulk capacitor 195 acts as a low pass filter storing energy to maintain the input voltage 105 at a level that allows the power converter 100 to supply the required output power to load 165 between the AC line cycles. As such, in one example, the voltage filtered rectified voltage across bulk capacitor 195 has a ripple voltage of magnitude typically less than 25% of the peak value of the DC voltage across capacitor 195 though the actual value of which is dependent on the value of the bulk capacitor 195 along with other operating conditions of the power converter 100.

The input voltage $V_{IN}$ 105 is coupled to an energy transfer element T1 175 and a switch S1 125. In the example of FIG. 1A, the energy transfer element T1 175 is coupled between an input of the power supply and an output of the power supply. In the example of FIG. 1, the energy transfer element T1 175 is illustrated as a transformer with one output winding 176. In other examples, the transformer may have more than one output winding, with additional windings to provide power to additional loads, to provide bias voltages, or to sense the voltage at a load.

As shown in the illustrated example, a clamp circuit 110 is coupled to the primary winding of the energy transfer element T1 175 to limit the maximum voltage across the switch S1 125. Power supply controller 145 is coupled to generate a drive signal coupled to be received by the switch 125 to control a switching of the switch 125 to regulate energy delivered from the input to the output of the power supply in response to a feedback signal 155 generated by a feedback circuit 160.

In one example, switch S1 125 is a transistor such as for example a power metal oxide semiconductor field effect transistor (MOSFET). In one example, controller 145 includes integrated circuits and discrete electrical components. In one example switch S1 125 and power supply controller 145 form part of a monolithic integrated circuit. In another, example switch S1 125 and power supply controller 145 form part of a hybrid integrated circuit where for example they are separate silicon die but housed in the same integrated circuit package. The switching of switch S1 125 produces pulsating current $I_D$ 120 flowing through the input winding 177 of energy transfer element T1 175 as illustrated in FIG. 1B. Energy stored in the energy transfer element during the on time of switch 125, is transferred to output capacitor 135 during the switch 125 off time.

As shown in the depicted example, the power converter output quantity to be regulated is $U_O$ 150, which in general could be an output voltage $V_O$, an output current $I_O$, or a combination of the two. The regulated quantity is not necessarily fixed, but can be regulated to change in a desired way through the design of the feedback circuit 160. For example, in one example, the output $U_O$ changes from an output voltage to an output current in response to the magnitude of the output voltage or the output current. Feedback circuit 160 is coupled to receive the output quantity $U_O$ 150 to produce a feedback signal $U_{FB}$ 155, which is coupled as an input signal to the power supply controller 145.

As illustrated in the example of FIG. 1A, another input signal to the controller 145 is the feedforward signal $U_{FF}$ 170, which is an output of a feedforward circuit 140. The feedforward circuit 140 is coupled to receive a signal $U_I$ 115, which is a function of power converter 100 input voltage $V_{IN}$ 105. In the example, both $U_I$ 115 and $U_{FF}$ 170 may be either voltage or current signals. In one example, signals $U_I$ 115 and $U_{FF}$ 170 are the same signal, where, for example, feedforward circuit 140 includes a resistor.

In the illustrated example, it is appreciated that FIG. 1A shows two possible ways to generate signal $U_I$ 115. In one example, signal $U_I$ 115 may be generated by coupling feedforward circuit 140 directly to the power converter 100 input voltage $V_{IN}$ 105. In another example, signal $U_I$ 115 may be generated by coupling feedforward circuit 140 to the output of a circuit 185, which includes a forward winding 178 of energy transfer element 175. The signal generated by forward winding 178 is rectified and smoothed by components 179 and 181. In the example, the voltage appearing across winding 178 during the switch 125 on time is directly proportional to the input voltage $V_{IN}$ 105 and can therefore be used to generate signal 115 to be applied to feedforward circuit 140 in accordance with the teachings of the present invention.

FIG. 1B also illustrates generally an example waveform for current $I_D$ 120 to show the parameters that the controller can adjust to regulate the output quantity $U_O$ 150. As shown in the example, the maximum of current $I_D$ 120 is $I_{MAX}$ 121, the switching period is $T_S$ 122, and the duty cycle is D 124. The controller typically limits the duty cycle to a maximum $D_{MAX}$ that is less than 100%. In one example, controller 145 includes an oscillator that defines a substantially regular switching period $T_S$ 122. In one example, regulation is accomplished by control of the switch S1 125 on time within a switching period. In each switching period, the fraction of the switching period that the switch is on is the duty cycle (D) of the switch. In one example, regulation is accomplished by control of the maximum current $I_{MAX}$ 121 of the switch. In another example, regulation is accomplished by control of the switching period $T_S$ 122. Regardless of whether $I_{MAX}$ 121 or $T_S$ 122 is controlled, the switch on time as a fraction of the switching period is modulated and therefore the regulation mode can be regarded as a duty cycle mode of control in accordance with the teachings of the present invention.

Figure 2:
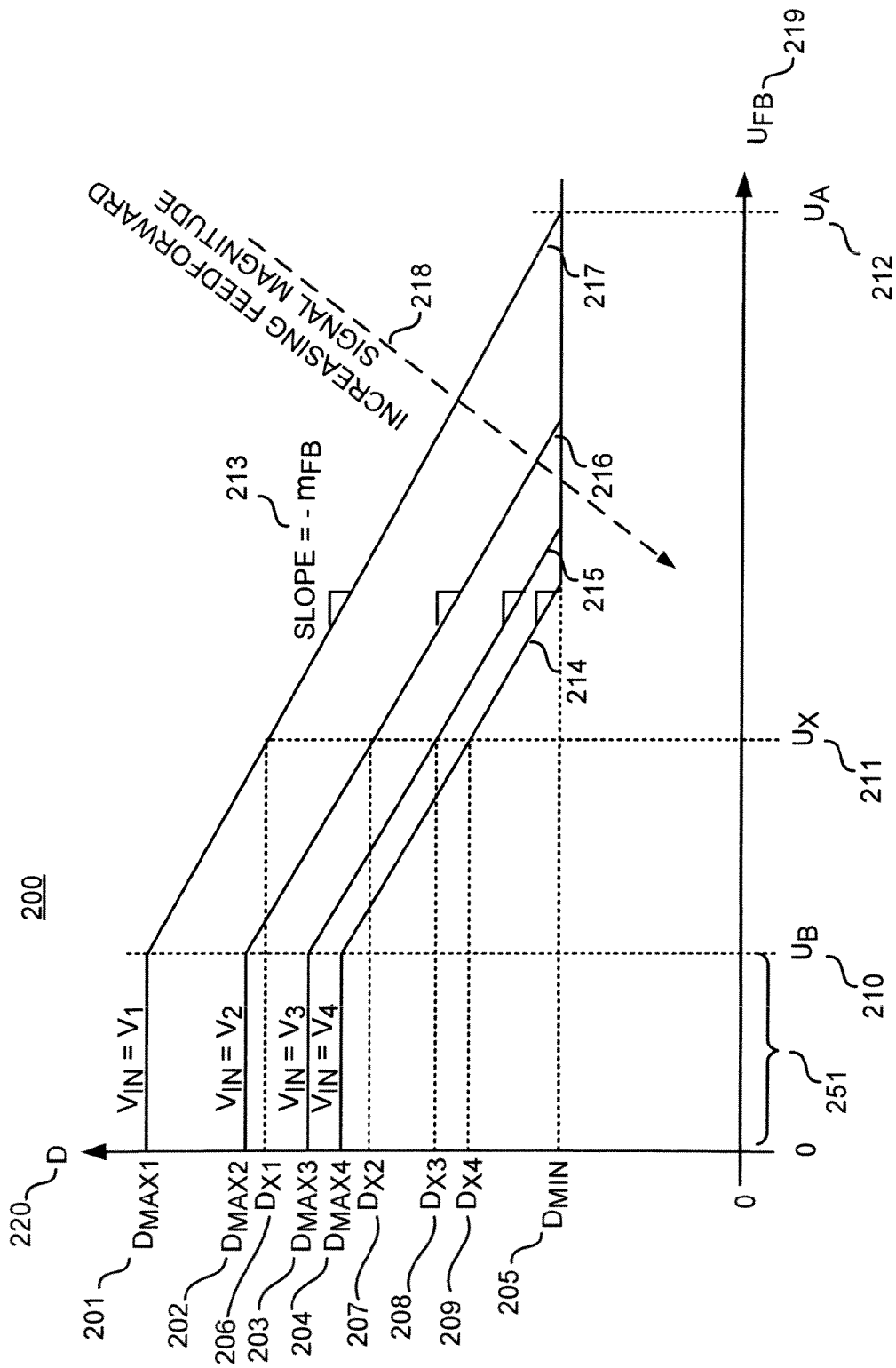
FIG. 2 shows generally duty cycle control waveforms for an example power supply controller circuit responsive to a feedforward signal in accordance with the teachings of the present invention.

FIG. 2 shows generally one example of duty cycle control waveforms that in one example could be applied by controller 145 to control the switching of switch S1 125 in response to feedback signal 155 and feedforward signal 170. In general, the four characteristics 217, 216, 215 and 214 correspond to the value of $V_{IN}$ 105 increasing between values $V_1$, $V_2$, $V_3$ and $V_4$, respectively, as indicated by arrow 218. For any fixed input voltage value, the maximum duty cycle and duty cycle for a given value of the feedback signal $U_{FB}$ 219 are defined by a specific duty cycle 220 versus feedback signal 219 characteristic. However, as the feedforward signal magnitude increases, both maximum duty cycle and duty cycle for a given value of the feedback signal 219 reduce.

In one example, the magnitude of the feedforward signal increasing corresponds to the power converter input voltage increasing. In the example, for a fixed feedback signal value $U_X$ 211, the power supply controller 145 varies the switch 125 duty cycle between values $D_{X1}$ 206 to $D_{X2}$ 207, $D_{X3}$ 208 and $D_{X4}$ 209 as the input voltage varies from $V_1$ to $V_2$, $V_3$ and $V_4$ respectively. The variation of duty cycle of switch 125 between $D_X$ 206 to $D_{X4}$ 209 as the input voltage varies from $V_1$ to $V_2$, $V_3$ and $V_4$, is therefore independent of feedback signal $U_{FB}$ 155. In the example, the slope of duty cycle versus feedback current, when the feedback signal exceeds the value $U_B$ 210, is unresponsive to the value of the feedforward signal and remains a fixed slope—$m_{FB}$ 213 until duty cycle value $D_{MIN}$ 205 is reached. In other examples, the slope 213 could be non-linear in nature in accordance with the teachings of the present invention.

Figure 3:
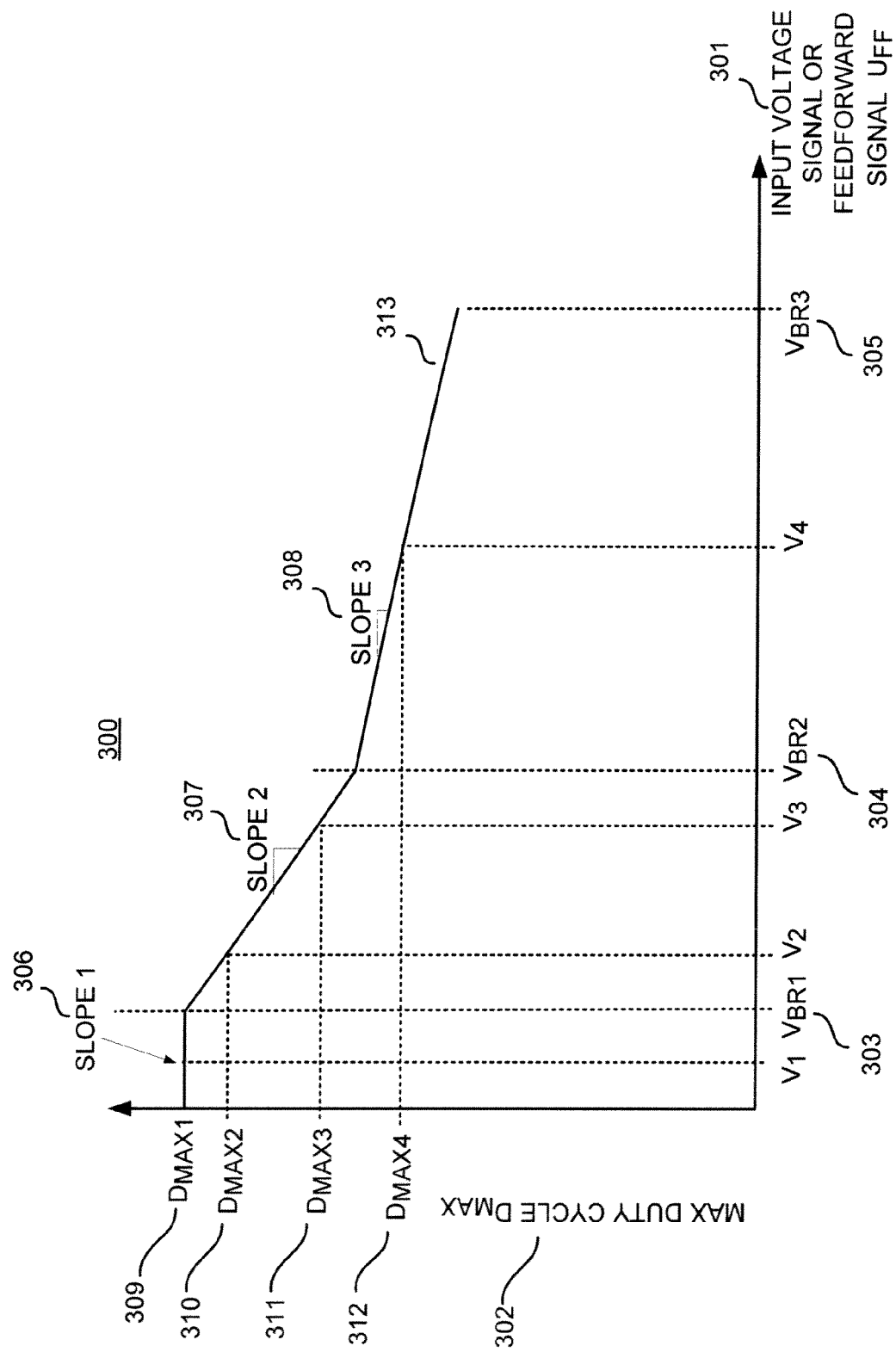
FIG. 3 shows generally maximum duty cycle control waveforms for an example power supply controller circuit responsive to a feedforward signal in accordance with the teachings of the present invention.

FIG. 3 shows generally one example of the relationship between maximum duty cycle $D_{MAX}$ 302 and feedforward or input voltage signal $U_{FF}$ 301 magnitude that in one example could be applied by controller 145 to control the switching of switch S1 125 in response to feedforward signal 170. In the example, the maximum duty cycle of the drive signal controlling the switch is varied in response to a plurality of linear functions over a range of values of the input voltage signal or feedforward signal in accordance with the teachings of the present invention. For instance, in the illustrated example, the varying of the maximum duty cycle is a first linear function of the input voltage signal when the input voltage signal is below a first threshold value $V_{BR1}$ 303. The varying maximum duty cycle is a second linear function of the input voltage signal when the input voltage signal is between the first threshold value $V_{BR1}$ 303 and a second threshold value $V_{BR2}$ 304. The varying of the maximum duty cycle is a third linear function of the input voltage signal when the input voltage signal is between the second threshold value $V_{BR2}$ 304 and a third threshold value $V_{BR3}$ 305.

As shown in the example, the slopes of the first, second and third linear functions are slope 1 306, slope 2 307 and slope 3 308, respectively. In one example, slope 1 306 has a slope substantially equal to zero, though in other examples slope 1 306 could also have a non-zero slope while in accordance with the teachings of the present invention. One reason slope 1 306 could have a slope substantially equal to zero is that the power supply controller 145 may have to limit the absolute maximum duty cycle that can ever be applied to the switching of switch 125 for practical reasons related to the design of the power supply controller 145 but also to limit stress on the switch 125 under power supply fault conditions for example.

In one example maximum duty cycle values $D_{MAX1}$ 309, $D_{MAX2}$ 310, $D_{MAX3}$ 311 and $D_{MAX4}$ 312 correspond to $D_{MAX1}$ 201, $D_{MAX2}$ 202, $D_{MAX3}$ 203 and $D_{MAX4}$ 204, respectively, in FIG. 2. In the example, first, second and third linear functions of the input voltage signal are linear reductions in maximum duty cycle as the input voltage signal increases. In another example, slope 3 308 could also have a slope substantially equal to zero in accordance with the teachings of the present invention.

Figure 4:
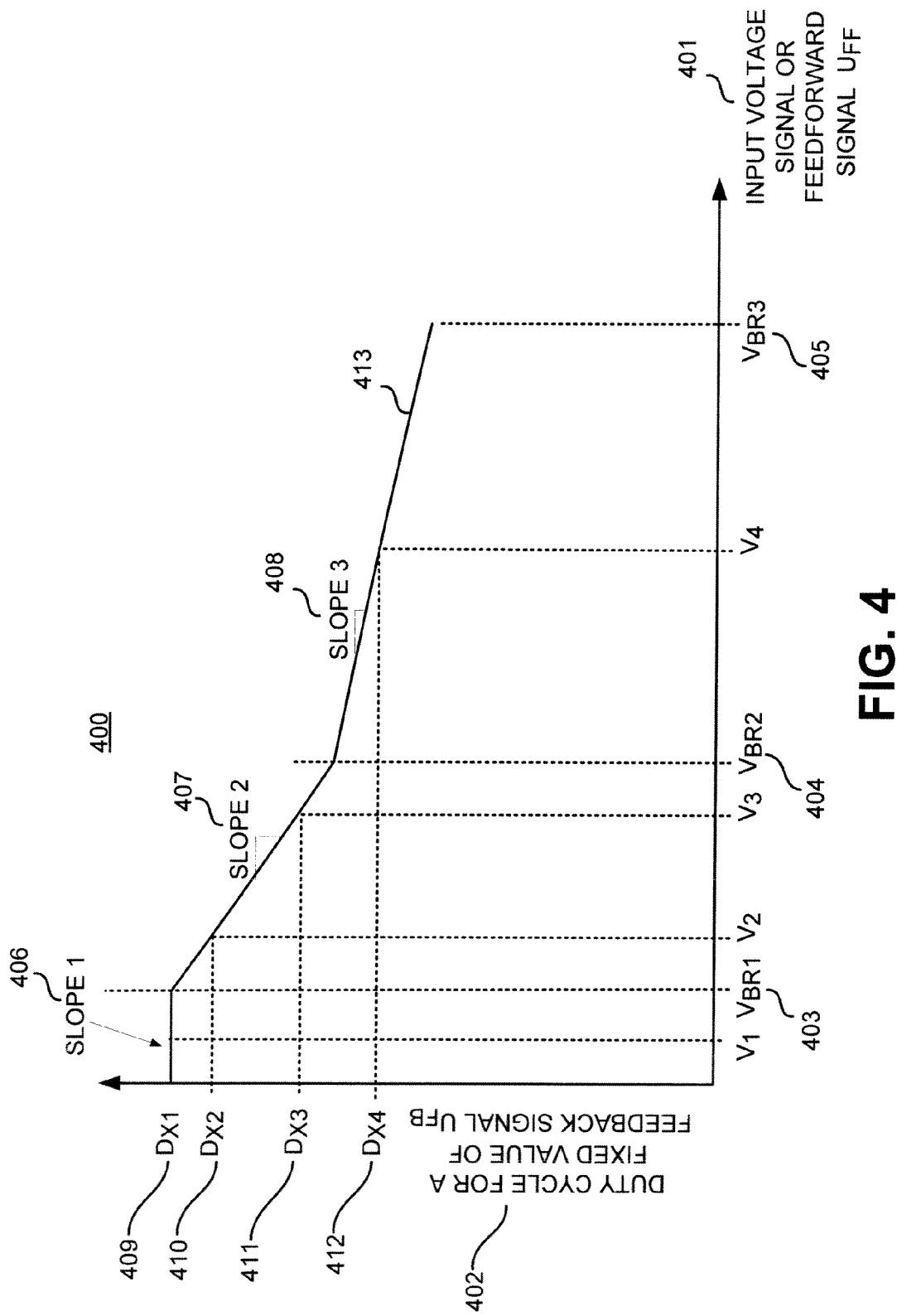
FIG. 4 shows generally duty cycle for a fixed value of feedback signal control waveforms for an example power supply controller circuit responsive to a feedforward signal in accordance with the teachings of the present invention.

FIG. 4 shows generally one example of the relationship between duty cycle 402 for a given or fixed value of feedback signal $U_{FB}$ and feedforward $U_{FF}$ or input voltage signal 401 magnitude, which in one example could be applied by controller 145 to control the switching of switch S1 125 in response to feedforward signal 170. In one example, the given or fixed value of the feedback signal could be $U_X$ 211 in FIG. 2 though it is appreciated that the given of fixed value of feedback signal could be any value of the feedback signal greater than $U_B$ 210 in FIG. 2.

In the example, the duty cycle of the drive signal controlling the switch for a fixed value of the feedback signal is varied in response to a plurality of linear functions over a range of values of the input voltage signal or feedforward signal in accordance with the teachings of the present invention. For instance, in the illustrated example, the varying of the duty cycle for the fixed value of the feedback signal is a first linear function of the input voltage signal when the input voltage signal is below a first threshold value $V_{BR1}$ 403. The duty cycle of the switch is a second linear function of the input voltage signal when the input voltage signal is between the first threshold value $V_{BR1}$ 403 and a second threshold value $V_{BR2}$ 404. The duty cycle of the switch is a third linear function of the input voltage signal when the input voltage signal is between the second threshold value $V_{BR2}$ 404 and a third threshold value $V_{BR3}$ 405.

As illustrated in the example, the slopes of the first, second and third linear functions are slope 1 406, slope 2 407 and slope 3 408, respectively. In one example, slope 1 406 has a slope substantially equal to zero though other examples, it is appreciated that slope 1 406 could also have a non-zero slope in accordance with the teachings of the present invention. In one example duty cycle values $D_{X1}$ 409, $D_{X2}$ 410, $D_{X3}$ 411 and $D_{X4}$ 412 correspond to $D_{X1}$ 206, $D_{X2}$ 207, $D_{X3}$ 208 and $D_{X4}$ 209, respectively, in FIG. 2. In the example, first, second and third linear functions of the input voltage signal are linear reductions in duty cycle as the input voltage signal increases. In another example, slope 3 408 could also have a slope substantially equal to zero in accordance with the teachings of the present invention.

Figure 5:
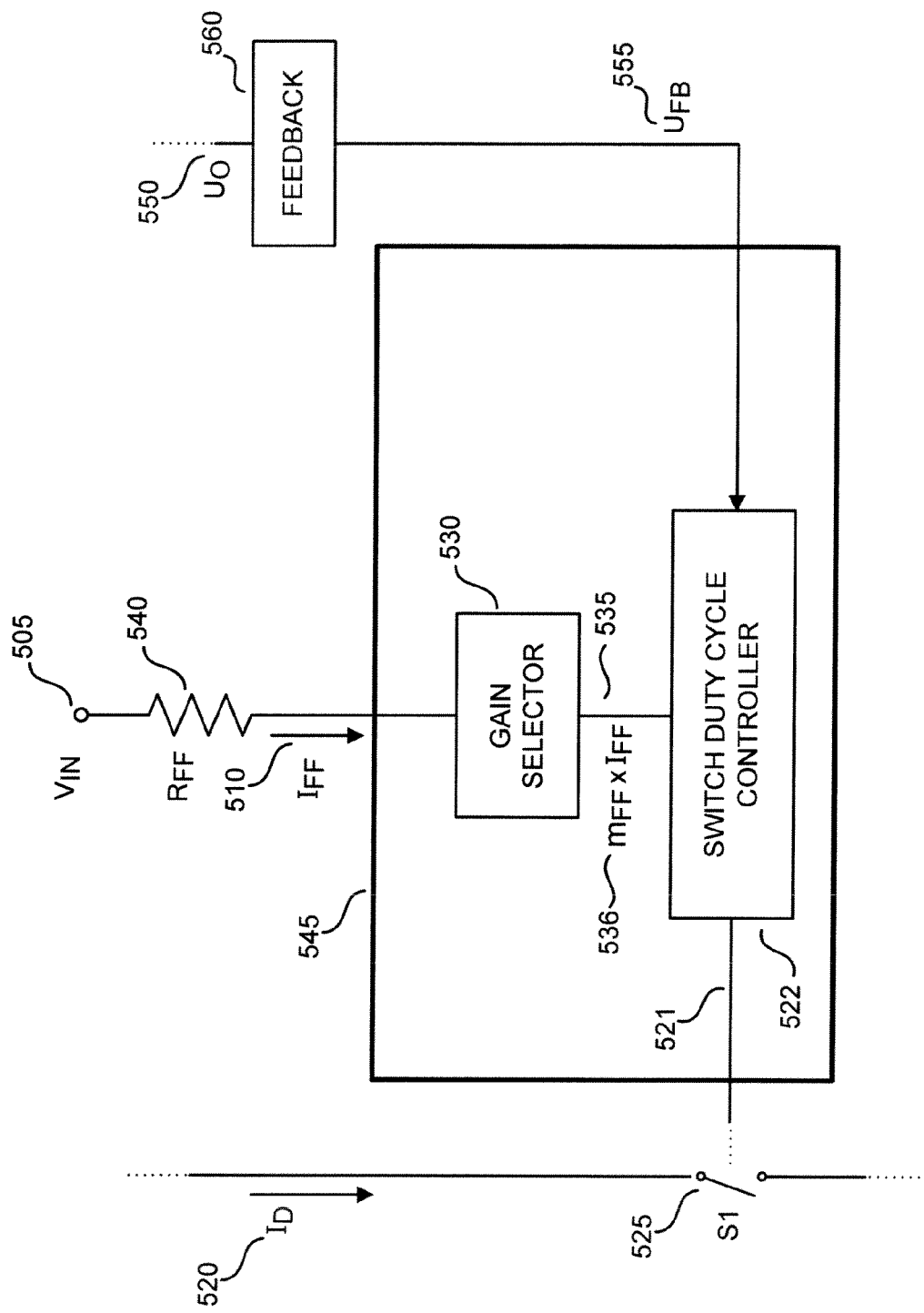
FIG. 5 shows generally an example power supply controller circuit responsive to a feedforward signal and a feedback signal in accordance with the teachings of the present invention.

FIG. 5 shows one example of an internal block diagram of a power supply controller 545 including a switch duty cycle controller 522 coupled to a feed forward gain selector circuit 530 in accordance with the teachings of the present invention. In the example, feed forward gain selector circuit 530 is coupled to receive feedforward signal $I_{FF}$ 510. In one example, the input DC voltage $V_{IN}$ 505 is equivalent to $V_{IN}$ 105 in FIG. 1. In one example, switch S1 525 is equivalent to switch 125 in FIG. 1 and the current flowing through switch 525 $I_D$ 520 is equivalent to $I_D$ 120 in FIG. 1.

As shown in the example, $V_{IN}$ 505 is coupled to feedforward circuit 540, which in the example is illustrated as a resistor $R_{FF}$. In another example, feedforward circuit 540 could be a resistor divider and feedforward signal 510 could be a voltage signal. In the example, the current $I_{FF}$ 510 flowing through feedforward circuit 540 is a feedforward or input voltage signal, which in one example is equivalent to signal $U_{FF}$ 170 in FIG. 1. Therefore, as $V_{IN}$ 505 increases, feedforward signal $I_{FF}$ 510 also increases.

In the example, feedforward $I_{FF}$ or input voltage signal 510 is coupled to gain selector circuit 530. Gain selector circuit 530 generates a duty cycle adjust signal 535 that is coupled to switch duty cycle controller circuit 522. In the example, switch duty cycle controller circuit 522 is also coupled to receive feedback signal $U_{FB}$ 555. Gain selector circuit 530 selects the gain applied to the feedforward signal 510. The gain applied determines the characteristic of maximum duty cycle as a function of input voltage $V_{IN}$ 505 as illustrated in FIG. 3. The gain applied also determines the characteristic of duty cycle for a given or fixed value of feedback signal as a function of input voltage $V_{IN}$ 505 as illustrated in FIG. 4. Since in FIG. 3 and FIG. 4 the slope of the characteristics 313 and 413 change depending on the magnitude of the input voltage, gain selector circuit 530 selects the gain multiplier $m_{FF}$ of term 536 according to the value of the feedforward signal $I_{FF}$ 510 in accordance with the teachings of the present invention. The circuitry to perform this function is described in FIG. 6 below.

Figure 6:
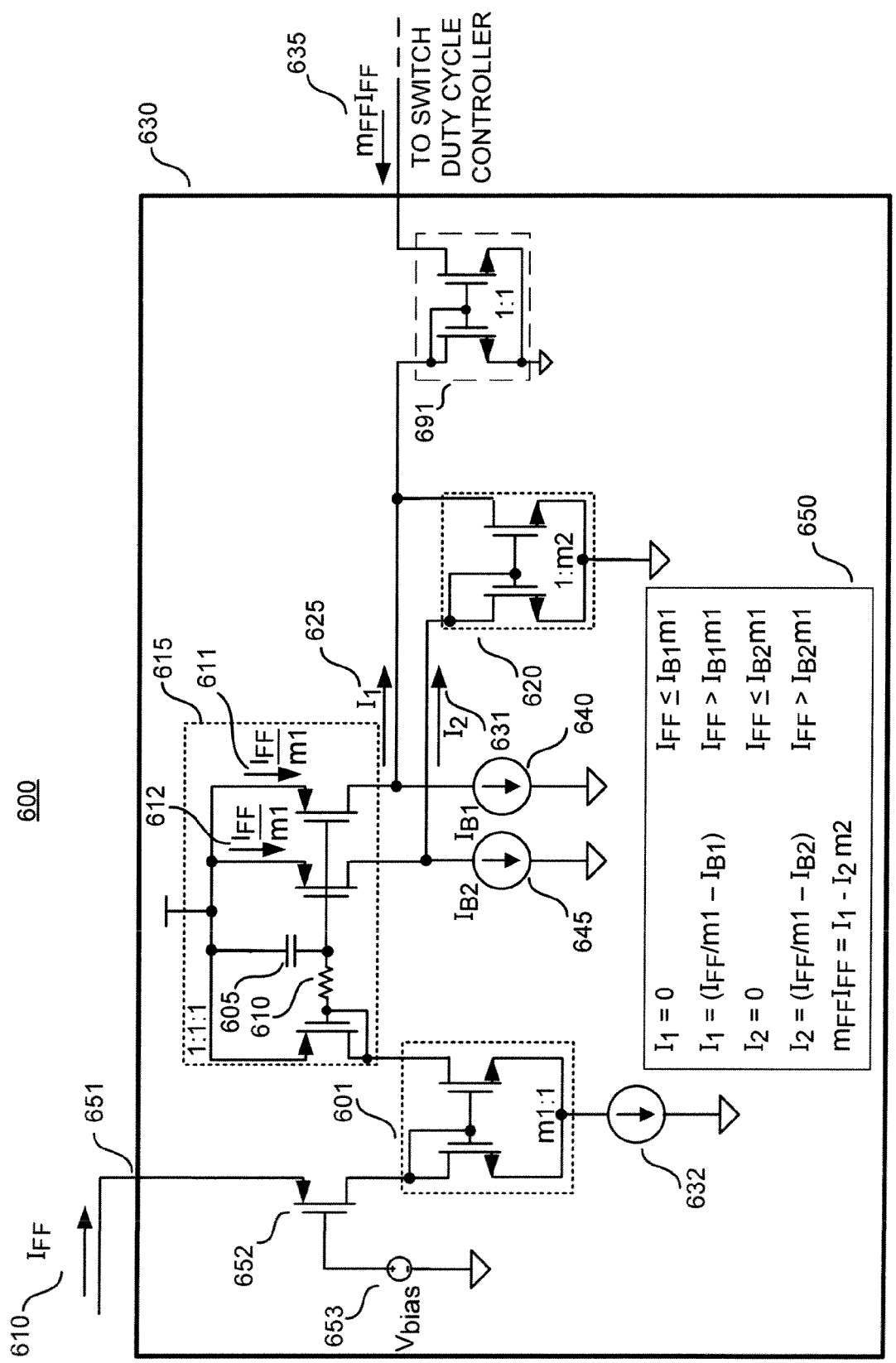
FIG. 6 is a schematic illustrating generally an example of a portion of a power supply controller circuit responsive to a feedforward signal and a feedback signal in accordance with the teachings of the present invention.

FIG. 6 shows generally an example schematic of a gain selector circuit 630 coupled to receive a feedforward $I_{FF}$ or input voltage signal 610 at terminal 651. Gain selector circuit 630 generates a signal 635 that is coupled to be received by a switch duty cycle controller circuit discussed below with reference to FIG. 7. Transistor 652 and voltage source 653 set the voltage at terminal 651, which for example allows the value of resistor 540 in FIG. 5 to be accurately calculated to provide a desired value of feedforward signal 510 for a given input voltage 505. Current source 632 limits the maximum current that can flow through transistor 652 to ensure the stability of the voltage at terminal 651 under normal operating conditions.

As shown in the example, the feedforward current 610 is mirrored by current mirror 601. In the example, the current mirror 601 sets a ratio m1:1, which reduces the mirrored current to a lower value than the feedforward current 610 to reduce internal power consumption of gain selector circuit 630. The current is again mirrored by one to one current mirror 615 to generate two equal currents 612 and 611 of value $I_{FF}$/m1. The RC filter including of capacitor 605 and resistor 610 provides noise filtering. In one example, current source $I_{B2}$ 645 is greater in value than current source 640 $I_{B1}$.

In the example, for values of $I_{FF}$/m1 611 less than or equal to $I_{B1}$ 640, $I_1$ 625 and therefore $m_{FF}I_{FF}$ 635, which substantially equal to $I_1$ 625 through the action of one to one current mirror 691, are substantially zero. For values of $I_{FF}$/m1 611 and 612 greater than $I_{B1}$ 640 but less than or equal to $I_{B2}$ 645, $I_1$ 625 and therefore duty cycle adjust signal $m_{FF}I_{FF}$ 635 is substantially equal to ($I_{FF}$/m1–$I_{B1}$). For values of $I_{FF}$/m1 611 and 612 greater than $I_{B2}$ 645, $m_{FF}I_{FF}$ 635 is substantially equal to ($I_{FF}$/m1–$I_{B1}$)–($I_{FF}$/m1–$I_{B2}$)m2. Where m2 is the ratio of current mirror 620, which is applied to current $I_2$ 631 before it is subtracted from current $I_1$ 625. In general therefore the following relationship is true:

$$m_{FF}I_{FF} = I_1 - I_2 m2 \qquad (1)$$

The relationships above are also summarized in box 650 of FIG. 6.

In the example, the gain applied to feedforward signal $I_{FF}$ 610 by gain selector circuit 630 has three sections. The variation therefore in gain of duty cycle adjust signal 635 depending on the relative values of $I_1$ and $I_2$ which is coupled to switch duty cycle controller in one example provides the characteristics illustrated in FIG. 2 and FIG. 3. In one example, the condition where $I_{FF}$/m1 611 is less than or equal to $I_{B1}$ 640 corresponds to slope 1 306 and 406 in FIGS. 3 and 4 respectively. In one example, the condition where $I_{FF}$/m1 611 is greater than $I_{B1}$ 640 but less than or equal to $I_{B2}$ 645 corresponds to slope 2 307 and 407 in FIGS. 3 and 4 respectively. In one example, the condition where $I_{FF}$/m1 611 is greater than $I_{B2}$ 645 corresponds to slope 3 308 and 408 in FIGS. 3 and 4 respectively. The way in which signal $m_{FF}I_{FF}$ 635 is processed by the switch duty cycle controller circuit is described below with reference to FIG. 7.

Figure 7:
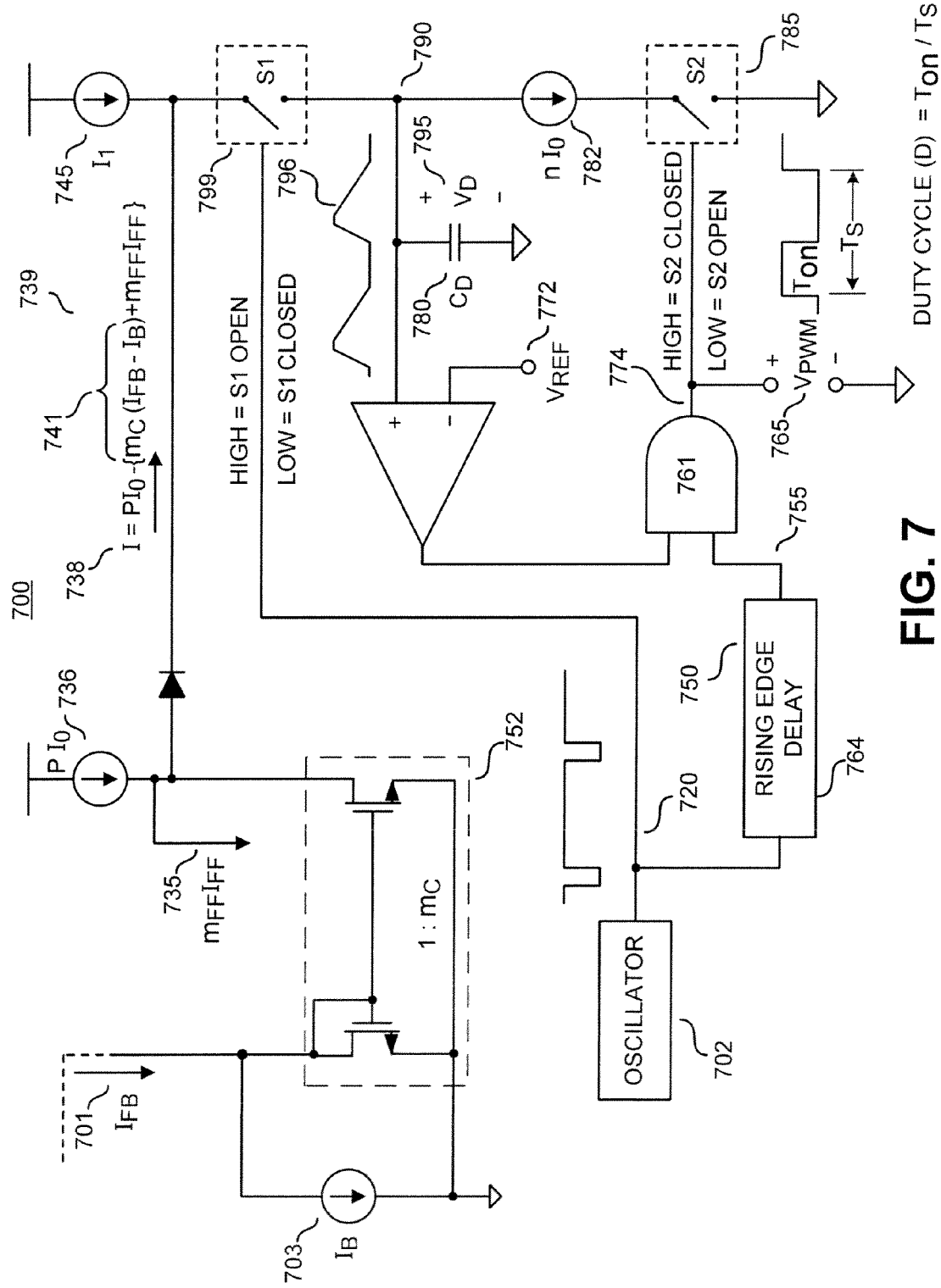
FIG. 7 is a schematic illustrating generally an example of a portion of a power supply controller circuit responsive to a duty cycle adjust signal and a feedback signal in accordance with the teachings of the present invention.

FIG. 7 shows generally a schematic of a portion of a power supply controller circuit 700. The circuit 700 is coupled to receive a feedback signal $I_{FB}$ 701, which in one example is equivalent to feedback signal 555 in FIG. 5. The circuit 700 is coupled to receive a duty cycle adjust signal 735 which in one example is equivalent to duty cycle adjust signal 535 in FIG. 5. The output of circuit 700 is the $V_{PWM}$ signal 765, which in one example is used to derive a drive signal 521 to drive the switching of switch 525 in FIG. 5.

When oscillator 702 output signal 720 is low, switch 799 is closed and capacitor 780 is charged at a rate determined by the sum of current source $I_1$ 745 and I 738. This corresponds to the rising edge of waveform 796, which is a representation of voltage $V_D$ 795 over time. During the time where oscillator 702 output signal 720 is low, output signal 774 from AND gate 761 is low as is $V_{PWM}$ signal 765 corresponding in one example to the time when switch 525 in FIG. 5 is off.

When oscillator 702 output signal 720 goes high, switch 799 is opened and charging of capacitor 780 is stopped. After a delay period determined by rising edge delay circuit 764, switch 785 is closed, causing the capacitor $C_D$ 780 to be discharged at a rate determined by current source 782. This corresponds to the falling region of waveform 796. The flat top portion of waveform 796 is caused by the delay between switching switch 799 off and switching switch 785 on.

The time taken for the voltage of waveform 796 to fall below reference voltage level 772, determines the on time Ton of $V_{PWM}$ output 765. Since the discharge rate of capacitor 780 is fixed by current source 782, the on time Ton of $V_{PWM}$ output 765 is determined by the rate at which capacitor 780 was charged during the period that switch 799 was closed. This in turn is a function of I 738 and $I_1$ 745. The on time Ton of $V_{PWM}$ output 765 as a proportion of the overall cycle time Ts is the duty cycle and in one example corresponds to the duty cycle of switch S1 525 in FIG. 5.

The PWM gain of the controller duty cycle characteristic as a function of feedback signal 701 is set by the relative magnitudes of current sources 736, 745 and 782 and in one example corresponds to the slope 213 in FIG. 2. However since this is not relevant to the teachings of the present invention, this is not discussed further here.

Examples in accordance with the teachings of the present invention relate to the influence of duty cycle adjust signal 735 on the duty cycle for a given feedback signal 701 value and the maximum duty cycle of for example switch 525 in FIG. 5. It is understood that other factors such as the current 520 flowing through switch 525 could also influence the actual on time of switch 525 in certain conditions. For example, if the power supply is operating in a fault condition where the current 520 is sensed to have exceeded safe levels, the on time of switch 525 could be terminated for this reason rather than the $V_{PWM}$ 765 signal going low in FIG. 7.

As shown in FIG. 7, relationship 739 governs the influence of feedback signal 701 and duty cycle adjust signal 735 on the charging of capacitor 780 and therefore the duty cycle of $V_{PWM}$ output signal 765. When duty cycle adjust signal 735 is substantially zero, in one example corresponding to a value of $I_1$ 625 of substantially zero in FIG. 6, relationship 739 becomes:

$$I = PI_O - m_c(I_{FB} - I_B) \quad (2)$$

In one example the relationship of equation 2 gives rise to a characteristic of duty cycle versus feedback signal 701 as defined by characteristic 217 in FIG. 2.

For all conditions when $I_{FF}/m1$ 611 in FIG. 6 is greater than $I_{B1}$ 640 duty cycle adjust signal 735 is finite. Relationship 739 is then:

$$I = PI_O - \{m_c(I_{FB} - I_B) + m_{FF} I_{FF}\} \quad (3)$$

The value of the slope of the duty cycle adjust signal 735 as a function of feedforward signal 610 is fixed and linear for each of the range of input voltage conditions as described with reference to FIGS. 5 and 6 above. For each condition when duty cycle adjust signal is non-zero, the relationship of equation 3 and 739 applies to determine the charge rate of capacitor 780.

It should be noted that the relationship in equation 3 and 739 is only true for values of feedback signal $I_{FB}$ 701 equal to or greater than current source $I_B$ 703. For values of feedback signal $I_{FB}$ 701 is less than current source $I_B$ 703, term 741 in relationship 739 is substantially zero, but does not go negative. This is due to the action of current mirror 752 whose output current cannot be less than zero.

In one example, the condition where feedback signal $I_{FB}$ 701 is less than current source $I_B$ 703 corresponds to region 251 FIG. 2, where changes in feedback signal 219 have no influence on the duty cycle D 220 which stays at a maximum value. However, increasing feedforward signal magnitude reduces the maximum duty cycle as illustrated by $D_{MAX}$ values 201, 202, 203 and 204. In one example, the value of feedback signal $U_B$ 210 that is required to influence the duty cycle D is fixed independent of the magnitude of the feedforward signal. In one example this corresponds to the circuit of FIG. 7 where the term 741 of relationship 739 is zero until the value of the feedback current $I_{FF}$ 701, is greater than current source $I_B$ 703.

Figure 8:
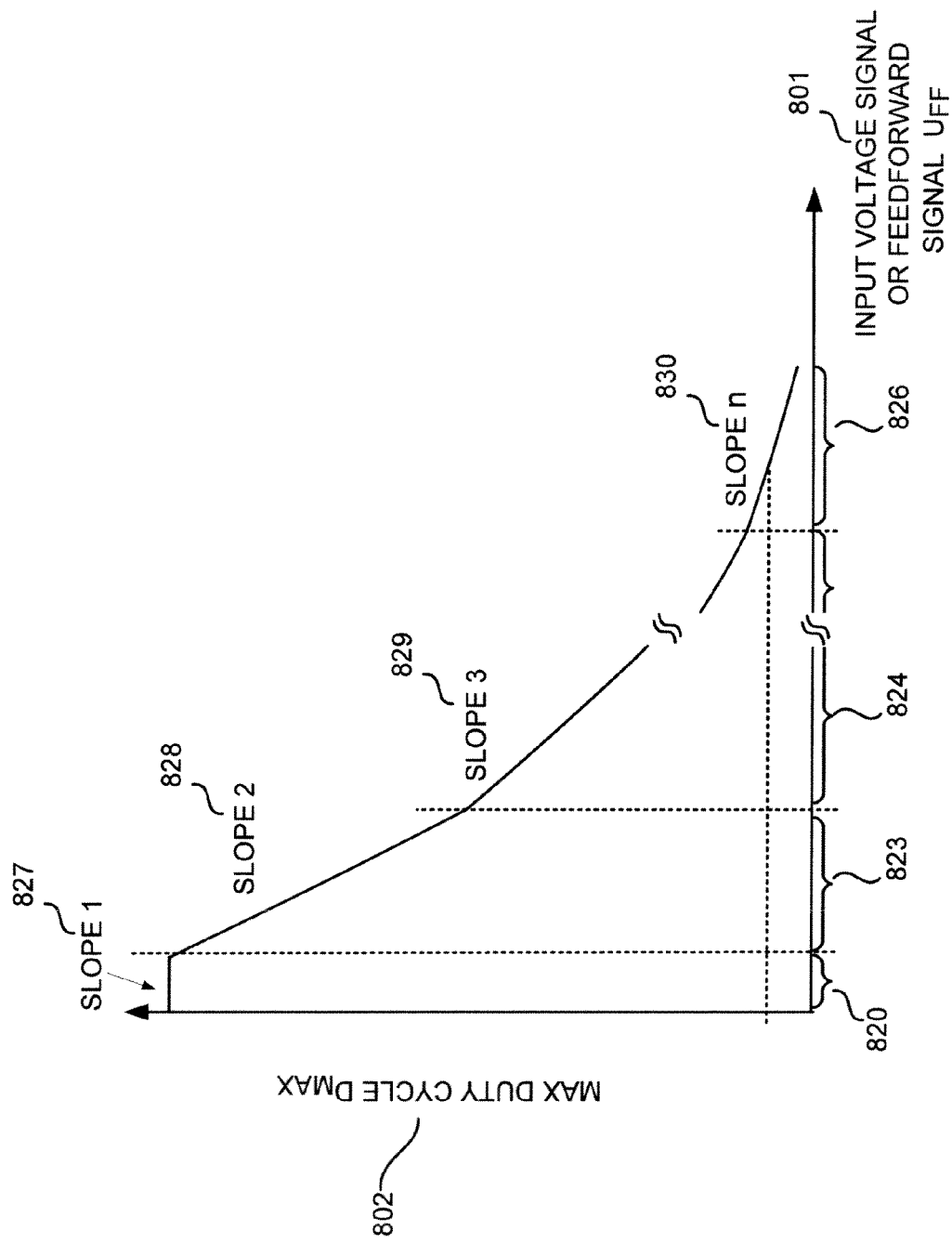
FIG. 8 shows generally maximum duty cycle control waveforms for an example power supply controller circuit responsive to a feedforward signal in accordance with the teachings of the present invention.

FIG. 8 shows generally one example of the relationship between maximum duty cycle 802 and feedforward or input voltage signal 801 magnitude that in one example could be applied in FIG. 5 by power supply controller 545 to control the switching of switch S1 525 in response to feedforward signal 510 in accordance with the teachings of the present invention.

In the example, the maximum duty cycle 802 is a plurality of linear functions of the input voltage signal 801 in accordance with the teachings of the present invention. In the example, the maximum duty cycle of the switch is a first linear function of the input voltage signal 801 when the input voltage signal is within a first range of values 820. The maximum duty cycle 802 of the switch is a second linear function of the input voltage signal 801 when the input voltage signal 801 is within a second range of values 823. The maximum duty cycle 802 of the switch is an nth linear function of the input voltage signal 801 when the input voltage signal is within an nth range of values 826.

In one example, slope 1 827 has a slope substantially equal to zero though it is understood that in other examples slope 1 827 could also have a non-zero slope in accordance with the teachings of the present invention. In one example, all linear functions other than that while the input voltage signal 801 is within a first range of values 820 are linear reduction of the maximum duty cycle 802 as the input voltage signal 801 increases. In another example, any one or more of the n slopes could have a slope substantially equal to zero as long as one of the n slopes has a linear reduction of the maximum duty cycle 802 as the input voltage signal 801 increases whilst still benefiting from the teachings of the present invention.

Figure 9:
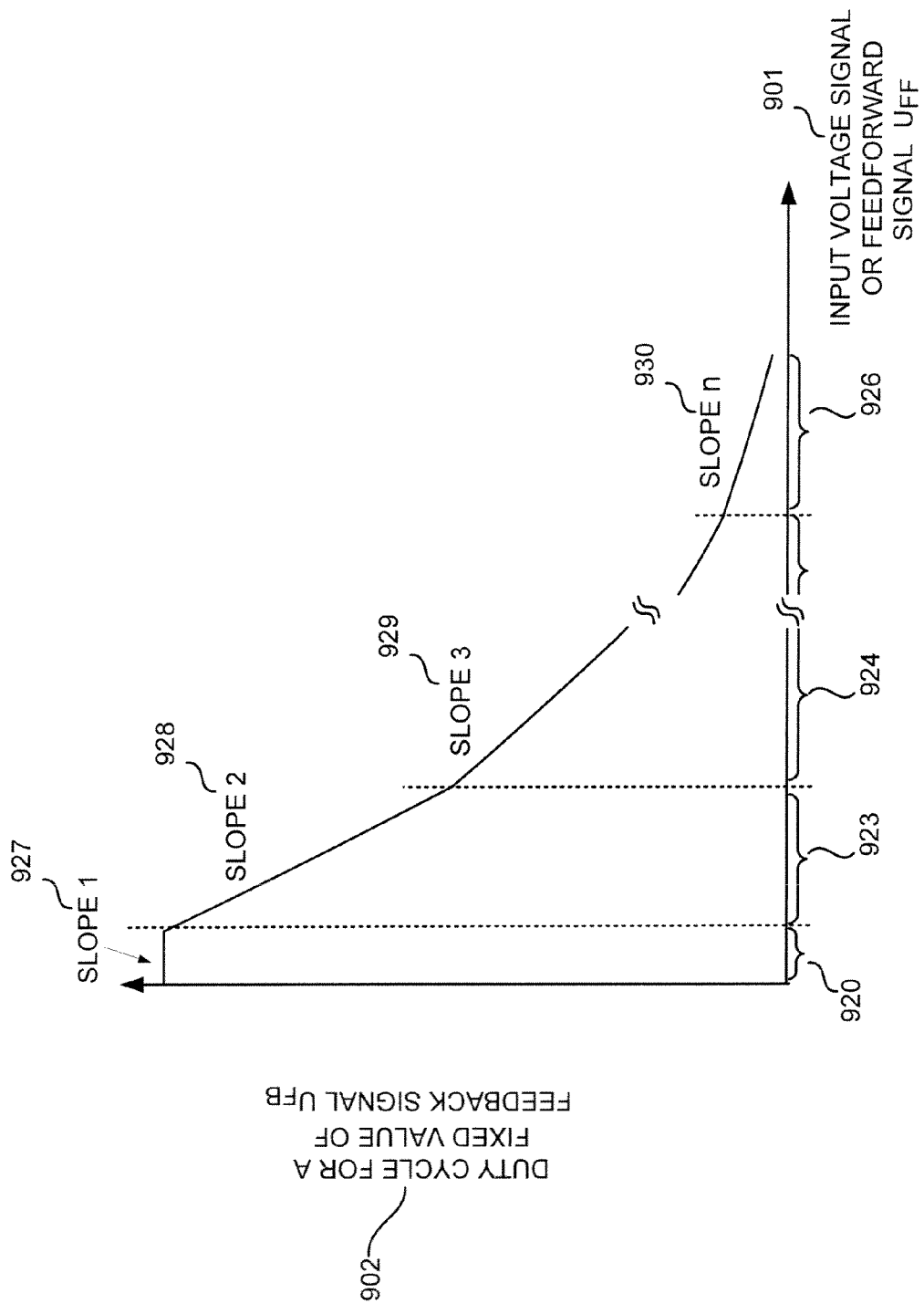
FIG. 9 shows generally duty cycle for a fixed value of feedback signal control waveforms for an example power supply controller circuit responsive to a feedforward signal in accordance with the teachings of the present invention.

FIG. 9 shows generally one example of the relationship between the duty cycle for a given or fixed value of feedback signal $U_{FB}$ 902 and feedforward or input voltage signal 901 magnitude that in one example could be applied in FIG. 5 by power supply controller 545 to control the switching of switch S1 525 in response to feedforward signal 510 for a fixed feedback signal value $U_{FB}$ 555. In the example the duty cycle for a fixed value of feedback signal $U_{FB}$ 902 is a plurality of linear functions of the input voltage signal 901.

In the example, the duty cycle for a fixed value of feedback signal $U_{FB}$ 902 of the switch is a first linear function of the input voltage signal 901 when the input voltage signal is within a first range of values 920. The duty cycle for a fixed value of feedback signal $U_{FB}$ 902 of the switch is a second linear function of the input voltage signal 901 when the input voltage signal 901 is within a second range of values 923. The duty cycle for a fixed value of feedback signal $U_{FB}$ 902 of the switch is an nth linear function of the input voltage signal 901 when the input voltage signal is within an nth range of values 926.

In one example, slope 1 927 has a slope substantially equal to zero though it is understood that in other examples slope 1 927 could also have a non-zero slope in accordance with the teachings of the present invention. In one example, all linear functions other than that while the input voltage signal 901 is within a first range of values 920 are linear reduction of the duty cycle 902 for a given or fixed value of feedback signal value as the input voltage signal 901 increases. In another example, any one or more of the n slopes could have a slope substantially equal to zero as long as at least one of the n slopes has a linear reduction of the duty cycle for a given or fixed value of the feedback signal 902 as the input voltage signal 901 increases whilst still benefiting from the teachings of the present invention.

Figure 10:
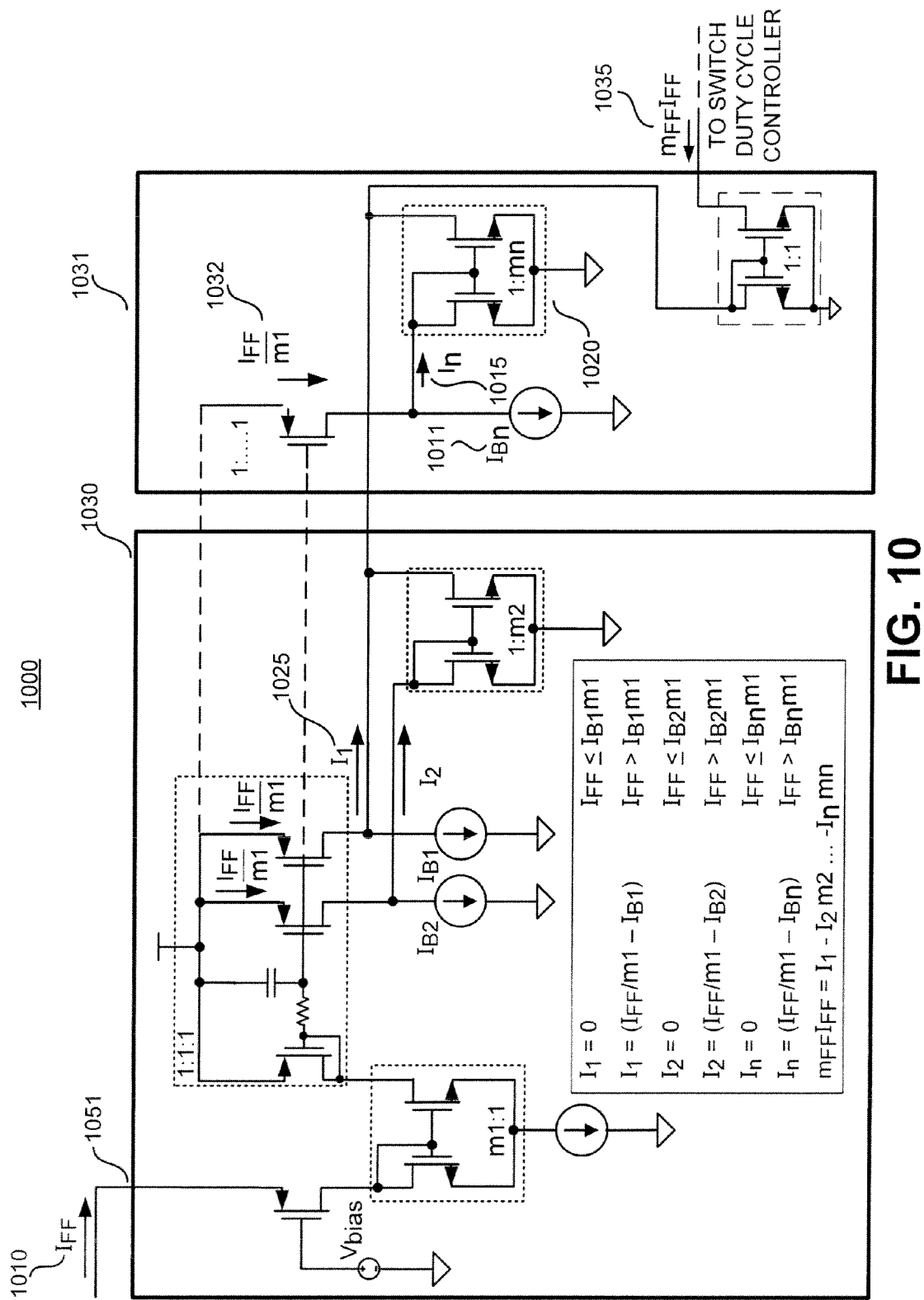
FIG. 10 is a schematic illustrating generally an example of a portion of a power supply controller circuit responsive to a feedforward signal and a feedback signal in accordance with the teachings of the present invention

FIG. 10 shows generally an example schematic of a gain selector circuit 1000 that in one example could be applied to generate the plurality of linear functions of the input voltage signal as discussed above with reference to FIGS. 8 and 9 in accordance with the teachings of the present invention. The portion of gain selector circuit 1030 in one example shares many aspects with block 630 in FIG. 6 and is therefore not discussed in detail here.

As shown, gain selector circuit 1000 is coupled to receive a feedforward $I_{FF}$ or input voltage signal 1010 at terminal 1051. Gain selector circuit 1000 generates a signal 1035 that is coupled to a switch duty cycle controller circuit, which in one example could be switch duty cycle controller 522 in FIG. 5. The gain selector circuit 1000 of FIG. 10 includes a plurality of blocks to generate a plurality of linear functions of duty cycle adjust signal 1035 as a function of input voltage signal 1010.

For clarity of explanation purposes, only the nth block 1031 is shown in FIG. 10, which in one example could implement the nth slope 830 or 930 in FIGS. 8 and 9 respectively. In the example, current $I_n$ 1015 is substantially zero until current $I_{FF}/m1$ 1032 exceeds the current $I_{Bn}$ 1011 where $I_{Bn} > \ldots > I_{B2} > I_{B1}$. For values of $I_{FF}/m1$ 1032 greater than $I_{Bn}$ 1011, the difference between $I_{FF}/m1$ 1032 and $I_{Bn}$ 1011 is multiplied by current mirror 1020 ratio of mn and subtracted from $I_1$ 1025. In general therefore the duty cycle adjust signal 1035 can be represented by the following relationship:

$$m_{FF}I_{FF}=I_1-I_2m2\ldots-I_nmn \quad (4)$$

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible, as those skilled in the relevant art will recognize. Indeed, it is appreciated that the specific voltages, currents, frequencies, power range values, times, etc., are provided for explanation purposes and that other values may also be employed in other embodiments and examples in accordance with the teachings of the present invention.

These modifications can be made to examples of the invention in light of the above detailed description. The terms used in the following claims should not be construed to limit the invention to the specific embodiments disclosed in the specification and the claims. Rather, the scope is to be determined entirely by the following claims, which are to be construed in accordance with established doctrines of claim interpretation.

What is claimed is:

1. A method, comprising:
generating a drive signal to control switching of a switch coupled to an energy transfer element to regulate energy delivered from an input of a power supply to an output of the power supply;
receiving an input voltage signal representative of an input voltage of the power supply;
applying a variable gain to the input voltage signal, wherein the variable gain is responsive to a magnitude of the input voltage; and
varying a maximum duty cycle of the drive signal in response to a plurality of linear functions over a range of values of the input voltage signal, wherein the variable gain corresponds to one of the plurality of linear functions.

2. The method of claim 1, wherein the plurality of linear functions includes a first linear function, a second linear function and a third linear function, wherein the maximum duty cycle of the drive signal is the first linear function of the input voltage signal when the input voltage signal is below a first threshold value, wherein the maximum duty cycle of the drive signal is a second linear function of the input voltage signal when the input voltage signal is between the first threshold value and a second threshold value, and wherein the maximum duty cycle of the drive signal is a third linear function of the input voltage signal when the input voltage signal is between the second threshold value and a third threshold value.

3. The method of claim 2, wherein a slope of the first linear function is substantially zero.

4. The method of claim 2, wherein the second linear function is a linear reduction of the maximum duty cycle as the input voltage signal increases.

5. The method of claim 2, wherein the third linear function is a linear reduction of the maximum duty cycle as the input voltage signal increases.

6. The method of claim 2, wherein a slope of the third linear function is substantially zero.

7. The method of claim 1, wherein the input voltage signal is a current.

8. The method of claim 1, wherein the input voltage signal is a voltage.

9. The method of claim 1, wherein at least one of the plurality of linear functions over a range of values of the input voltage signal is a linear reduction of the maximum duty cycle as the input voltage signal increases.

10. A method, comprising:
generating a drive signal to control switching of a switch coupled to an energy transfer element to regulate energy delivered from an input of a power supply to an output of the power supply;
receiving an input voltage signal representative of an input voltage of the power supply;
applying a variable gain to the input voltage signal, wherein the variable gain is responsive to a magnitude of the input voltage;
receiving a feedback signal; and
controlling a duty cycle of the drive signal in response to both the feedback signal and the input voltage signal, wherein the duty cycle of the drive signal, for a fixed value of the feedback signal, is varied in response to a plurality of linear functions over a range of values of the input voltage signal, wherein the variable gain corresponds to one of the plurality of linear functions.

11. The method of claim 10, wherein the plurality of linear functions includes a first linear function, a second linear function and a third linear function, wherein the duty cycle of the drive signal for the fixed value of the feedback signal is the first linear function of the input voltage signal when the input voltage signal is below a first threshold value, wherein the duty cycle of the drive signal for the fixed value of the feedback signal is a second linear function of the input voltage signal when the input voltage signal is between the first threshold value and a second threshold value, and wherein the duty cycle of the drive signal for the fixed value of the feedback signal is a third linear function of the input voltage signal when the input voltage signal is between the second threshold value and a third threshold value.

12. The method of claim 11, wherein a slope of the first linear function is substantially zero.

13. The method of claim 11, wherein the second linear function is a linear reduction of the duty cycle for the fixed value of the feedback signal as the input voltage signal increases.

14. The method of claim 11, wherein the third linear function is a linear reduction of the duty cycle for the fixed value of the feedback signal as the input voltage signal increases.

15. The method of claim 11, wherein a slope of the third linear function is substantially zero.

16. The method of claim 10, wherein the input voltage signal is a current.

17. The method of claim 10, wherein the input voltage signal is a voltage.

18. The method of claim 10, wherein at least one of the plurality of linear functions over a range of values of the input voltage signal is a linear reduction of the duty cycle for the fixed value of the feedback signal as the input voltage signal increases.

* * * * *